United States Patent
Liu et al.

(10) Patent No.: US 12,225,246 B1
(45) Date of Patent: Feb. 11, 2025

(54) SYSTEMS AND METHODS FOR RENDERING INTERACTIVE ELEMENTS IN A LIVE BROADCAST

(71) Applicant: HYTTO PTE. LTD.

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/605,695

(22) Filed: Mar. 14, 2024

Related U.S. Application Data

(63) Continuation of application No. 18/494,128, filed on Oct. 25, 2023.

(51) Int. Cl.
| | |
|---|---|
| *H04N 21/2187* | (2011.01) |
| *A61H 19/00* | (2006.01) |
| *G06T 7/20* | (2017.01) |
| *G06T 7/90* | (2017.01) |
| *H04N 21/431* | (2011.01) |
| *H04N 21/4725* | (2011.01) |

(52) U.S. Cl.
CPC ......... *H04N 21/2187* (2013.01); *A61H 19/00* (2013.01); *G06T 7/20* (2013.01); *G06T 7/90* (2017.01); *H04N 21/4316* (2013.01); *H04N 21/4725* (2013.01); *A61H 2201/5097* (2013.01)

(58) Field of Classification Search
CPC ........................ H04N 21/2187; H04N 21/4725
See application file for complete search history.

(56) References Cited

U.S. PATENT DOCUMENTS

| | | | |
|---|---|---|---|
| 11,228,812 B2 * | 1/2022 | Landow | ........... H04N 21/47815 |
| 11,770,591 B2 | 9/2023 | April et al. | |
| 2024/0129599 A1 * | 4/2024 | Basser | ................. H04N 21/235 |

OTHER PUBLICATIONS

Van Krevelen Dpoelman R , A survey of augmented reality technologies, applications and limitations , The International Journal of Virtual Reality, 2010, 9(2):1-20, Netherlands.

* cited by examiner

*Primary Examiner* — Hsiungfei Peng
(74) *Attorney, Agent, or Firm* — Evergreen Valley Law Group; Kanika Radhakrishnan

(57) ABSTRACT

The present invention relates to methods and systems for dynamically rendering interactive elements in a live broadcast. The method performed by an application server includes identifying chroma key areas in a live broadcast created by a creator and streamed to users via a live streaming interactive platform. The method includes obtaining an interactive element to be displayed in the chroma key areas based on user inputs from the creator and the users in the live streaming interactive platform, and live broadcast data. Further, the method includes rendering at least a portion of the interactive element in the chroma key areas based on an image fusion technique. The method includes rendering the live broadcast of the creator to the users upon post-processing of the interactive element, thereby enabling the users to view the interactive element rendered in the chroma key areas of the live broadcast.

19 Claims, 8 Drawing Sheets

SYSTEMS AND METHODS FOR RENDERING INTERACTIVE ELEMENTS IN A LIVE BROADCAST

TECHNICAL FIELD

The present invention relates generally to information processing techniques, and more particularly relates to systems and methods for dynamically rendering interactive elements on chroma key areas (i.e., green screen) in a live broadcast.

BACKGROUND

Currently, advancements in social media and the expansion of wireless communication interfaces, both in local and wide-area networking, have led to the development of methods and systems for enhancing sexual experiences. One prevalent example is the proliferation of live broadcasts featuring sexual content within the adult entertainment industry. These live broadcasts have experienced substantial growth over the years. For instance, models engaging in sexual acts, with or without the use of adult toys, are frequently streamed in such live broadcasts.

Due to advancements in technology, a live broadcast can be subjected to real-time editorial processes. Specifically, one or more green screen areas are defined within the live broadcast, enabling the model in the live broadcast to perform real-time editing. Typically, the green screen areas arranged within the live broadcast enable the model to customize the live broadcast's background using various editing techniques. For instance, during a live broadcast of a football game, the green screen technology can be used to display different advertisements on the billboards of the football field for viewers in different countries. Additionally, there are materials capable of emitting light that can be worn on a user's body, enabling different images to be projected onto the material during the live broadcast. However, the current green screen technology offers limited functionality and features to the model and/or users of the live broadcast. In particular, the content displayed on the green screen does not facilitate effective interaction with the model or the users during the live broadcast.

Therefore, there is a need for systems and methods for dynamically rendering interactive elements on the green screen areas in the live broadcast and providing a satisfying sexual stimulation experience to the users of the live broadcast, in addition to providing other technical advantages.

SUMMARY

Various embodiments of the present disclosure disclose methods and systems for dynamically rendering interactive elements in chroma key areas of a live broadcast.

In an embodiment, a computer-implemented method is disclosed. The computer-implemented method performed by an application server includes identifying one or more chroma key areas in a live broadcast created by a creator and streamed to one or more users via a live streaming interactive platform. The method includes obtaining an interactive element to be displayed in the one or more chroma key areas based on user inputs from at least the creator and the one or more users in the live streaming interactive platform, and live broadcast data. Further, the method includes rendering at least a portion of the interactive element in the one or more chroma key areas of the live broadcast based at least on an image fusion technique. The interactive element is subjected to post-processing for fusing the interactive element with at least a portion of the live broadcast outside the one or more chroma key areas. The method includes rendering the live broadcast of the creator to the one or more users upon post-processing of the interactive element, thereby enabling the one or more users to view the interactive element rendered in the one or more chroma key areas of the live broadcast.

In another embodiment, an application server is disclosed. The application server includes a communication interface, a memory configured to store instructions and a processor. The processor is configured to execute the instructions stored in the memory and thereby cause the application server to at least identify one or more chroma key areas in a live broadcast created by a creator and streamed to one or more users via a live streaming interactive platform. The application server is caused to obtain an interactive element to be displayed in the one or more chroma key areas based on user inputs from at least the creator and the one or more users in the live streaming interactive platform and live broadcast data. Further, the application server is caused to render at least a portion of the interactive element in the one or more chroma key areas of the live broadcast based at least on an image fusion technique. The interactive element is subjected to post-processing for fusing the interactive element with at least a portion of the live broadcast outside the one or more chroma key areas. The application server is caused to render the live broadcast of the creator to the one or more users upon post-processing of the interactive element, thereby enabling the one or more users to view the interactive element rendered in the one or more chroma key areas of the live broadcast.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present invention are described hereinafter with reference to FIG. 1 to FIG. 7.

Figure 1:
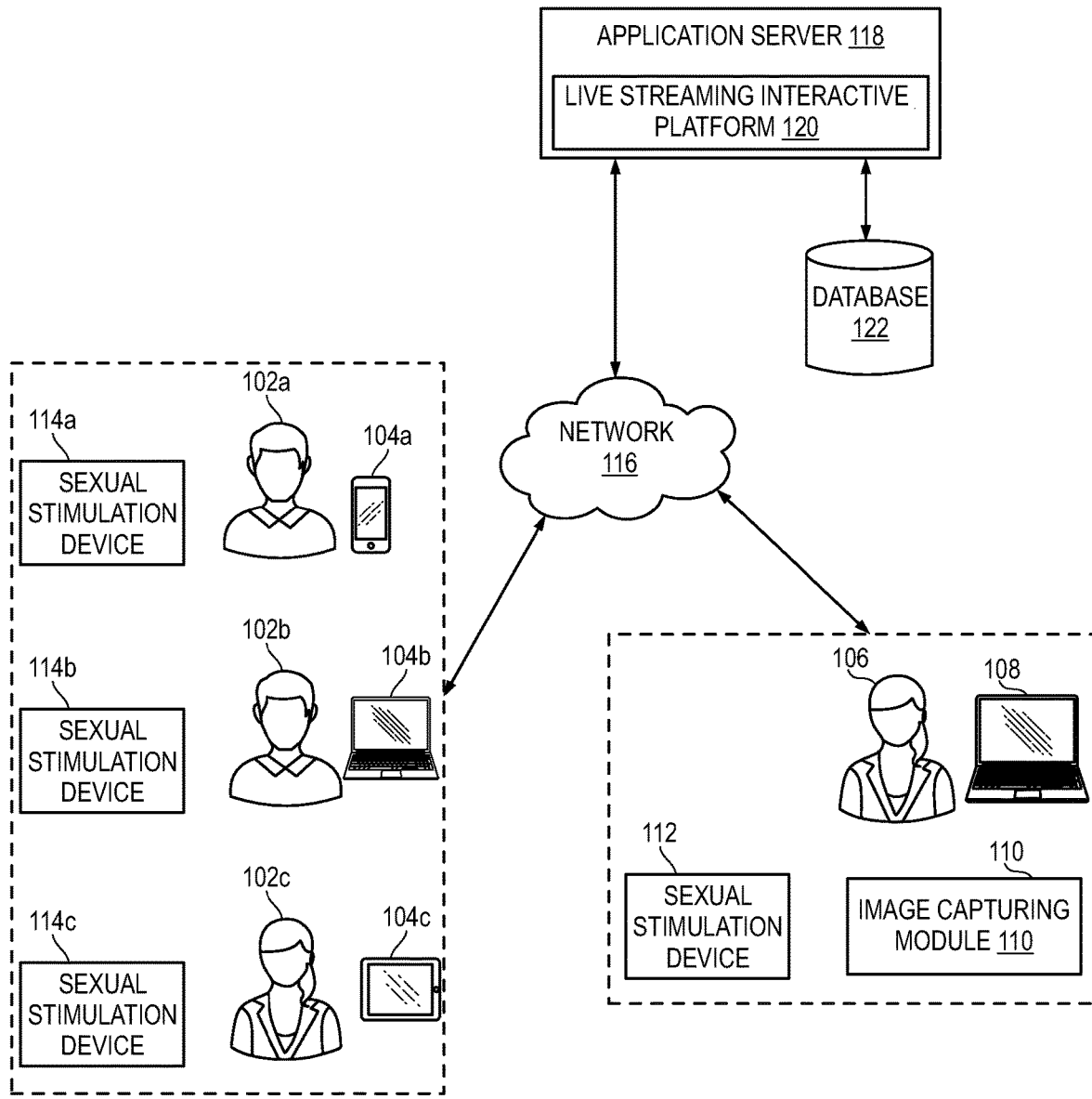
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of users 102 (collectively referring to a user 102a, a user 102b, and a user 102c). Each of the users 102a, 102b, and 102c is respectively associated with a user device 104a, a user device 104b, and a user device 104c. The user devices 104a-104c may include at least a laptop computer, a phablet computer, a handheld personal computer, a virtual reality (VR) device, a netbook, a Web book, a tablet computing device, a smartphone, or other mobile computing devices. Further, the environment 100 includes a creator 106. In an embodiment, the creator 106 may be a model performing sexual content. Furthermore, the creator 106 is associated with a user device 108 (exemplarily depicted to be 'a laptop computer') and an image capturing module 110. The image capturing module 110 may be connected to the user device 108 using wired/wireless communication. Some examples of wireless communication may include Bluetooth, near-field communication (NFC), wireless fidelity (Wi-Fi), and the like. In one scenario, the creator 106 captures the sexual content using the image capturing module 110. In another scenario, the creator 106 may utilize the image capturing module associated with the user device 108 for capturing the creator 106 performing the sexual content. Further, the creator 106 may live stream the sexual content being captured using the image capturing module 110 to the users 102a-102c through an online live streaming platform which will be explained further in detail.

Furthermore, the users 102a-102c are associated with a sexual stimulation device 114a, a sexual stimulation device 114b, and a sexual stimulation device 114c, respectively, and the creator 106 is associated with a sexual stimulation device 112. It is to be noted that the sexual stimulation devices 114a-114c and 112 are selected based on the gender of the users 102a-102c and the creator 106. For instance, the sexual stimulation devices 114a and 114b are male sex toy and the sexual stimulation devices 114c and 112 are female sex toys. Some examples of female sex toys may include, but are not limited to, a dildo, a vibrator, and the like. Examples of male sex toys may include masturbators. The sexual stimulation devices 114a-114c and 112 may be connected wirelessly with the respective user devices 104a-104c and 108. Some examples of the wireless connectivity for enabling connection between the sexual stimulation devices 114a-114c and 112 and the user devices 104a-104c and the user device 108 may be, but not limited to, near field communication (NFC), wireless fidelity (Wi-Fi), Bluetooth and the like.

Various entities in the environment 100 may connect to a network 116 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 116 may include a secure protocol (e.g., Hypertext Transfer Protocol (HTTP)), and/or any other protocol, or set of protocols. In an example embodiment, the network 116 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes an application server 118. The application server 118 is configured to host and manage a live streaming interactive platform 120. The application server 118 may be embodied in at least one computing device in communication with the network 116. The application server 118 may be specifically configured, via executable instructions to perform one or more of the operations described herein. In general, the application server 118 may be configured to render at least a portion of an interactive element in one or more chroma key areas defined in the live broadcast created by the creator 106 using the live streaming interactive platform 120. The live streaming interactive platform 120 is a set of computer-executable codes configured to allow the creator 106 to create the live broadcast for the users 102a-102c. In one embodiment, the live streaming interactive platform 120 may be accessed as a web based application on the user devices 102a-102c and 108. In another embodiment, the user devices 104a-104c and 108 may access an instance of the live streaming interactive platform 120 from the application server 118 for installing on the user devices 104a-104c and 108 using application stores associated with operating systems such as Apple iOS®, Android™ OS, Google Chrome OS, Symbian OS®, Windows Mobile® OS, and the like.

In an embodiment, the application server 118 is configured to monitor the live broadcast hosted by the creator 106 using the live streaming interactive platform 120. The applications server 118 identifies one or more chroma key areas (i.e., green screen areas) in the live broadcast of the creator 106. In an embodiment, the chroma key areas may be defined by the creator 106 in the live broadcast. In another embodiment, the chroma key areas may be pre-defined in the live broadcast by the application server 118. The creator 106 may provide inputs related to the chroma key areas in the live streaming interactive platform 120 for defining the chroma key areas when the live broadcast is created. Some examples of the chroma key areas may include a piece of green cloth hanging in the model's room, green paint smeared on the model's body, a closed green area defined by the creator 106 on the wall, and the like.

Thereafter, the application server 118 is configured to identify the chroma key areas in the live broadcast created by the creator 106 and streamed to the users 102a-102c in the live streaming interactive platform 120. The application server 118 obtains the interactive element to be displayed in the chroma key areas. In one scenario, the application server 118 may receive user inputs (e.g., comments, likes, rewards, body special effects, etc.) from either the creator 106 or at least one user among the users 102a-102c. The application server 118 may obtain the interactive element corresponding to the user inputs. In another scenario, the application server 118 may obtain the live broadcast data (e.g., number of users, number of comments, etc.) as the interactive element. The interactive element and the live broadcast data may be stored in a database 122 associated with the application server 118.

Upon obtaining the interactive element, the application server 118 renders at least a portion of the interactive element in the corresponding chroma key area of the one or more chroma key areas of the live broadcast. In particular, the application server 118 renders at least a portion of the interactive element in the chroma key areas of the live broadcast based at least on an image fusion technique. It is to be noted that the interactive element rendered in the one or more chroma key areas is subjected to post-processing for fusing the interactive element rendered in the one or more chroma key areas with at least a portion of the live broadcast outside the one or more chroma key areas. Thereafter, the live broadcast is rendered to the one or more users 102-102c, thus enabling the one or more users 102a-102c to view the interactive element displayed in the one or more chroma key areas of the live broadcast.

The application server 118 allows each of the users 102-102c to customize the interactive element as per their requirement by providing the user inputs related to the customization of the interactive element to be displayed in the live broadcast. This enables each user 102a-120c to view the interactive element in the live broadcast of the creator 106 as per their requirement. Thus, it is understood that the creator 106 and the users 102a-102c are allowed to interact with the interactive element displayed in the chroma key areas of the live broadcast.

In addition, the application server 118 allows the creator 106 to set one or more restrictions in the live broadcast. The restrictions in the live broadcast may include a live broadcast joining restriction and a viewing restriction. In an embodiment, the live broadcast created by the creator 106 can be made public to the users. In such a scenario, the creator 106 may receive a request from the users 102a-102c for joining the live broadcast. Upon approval of the request from the creator 106, the users 102a-102c are allowed to join the live broadcast. Further, the users 102a-102c may be allowed in the live broadcast without any prior approval from the creator 106, in case of no live broadcast joining restriction set for the live broadcast by the creator 106. In some embodiments, the creator 106 may create the live broadcast for a specific user (e.g., private one-to-one live broadcast) by setting the viewing restriction.

Further, the application server 118 is configured to allow the users 102-102c to render their real-time image data/video data in the corresponding chroma key areas of the live broadcast. Furthermore, the applications server 118 is configured to monitor one or more preset actions performed by the creator 106 in the live broadcast while the real-time image data of the user (e.g., the user 102a) including the sexual stimulation device 114a is rendered in a chroma key area of the live broadcast. As explained above, the live broadcast created by the creator 106 includes a sexual content performed by the creator 106. It will be apparent that the one or more preset actions (e.g., making a motion similar to masturbation) correspond to the sexual content. To that effect, the application server 118 creates a control instruction based on the preset actions and transmits it to the user device 104a of the user 102a. Upon receipt of the control instruction, the user device 104a operates the sexual stimulation device 114a to provide sexual stimulation to the user 102a corresponding to the preset actions performed by the creator 106 in the live broadcast. In other words, the action of the sexual stimulation device 114a can be changed with the preset action of the creator 106. For example, the faster the creator 106 moves the hand similar to masturbation, the higher the frequency of reciprocating stimulation will be provided by the sexual stimulation device 114a.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2:
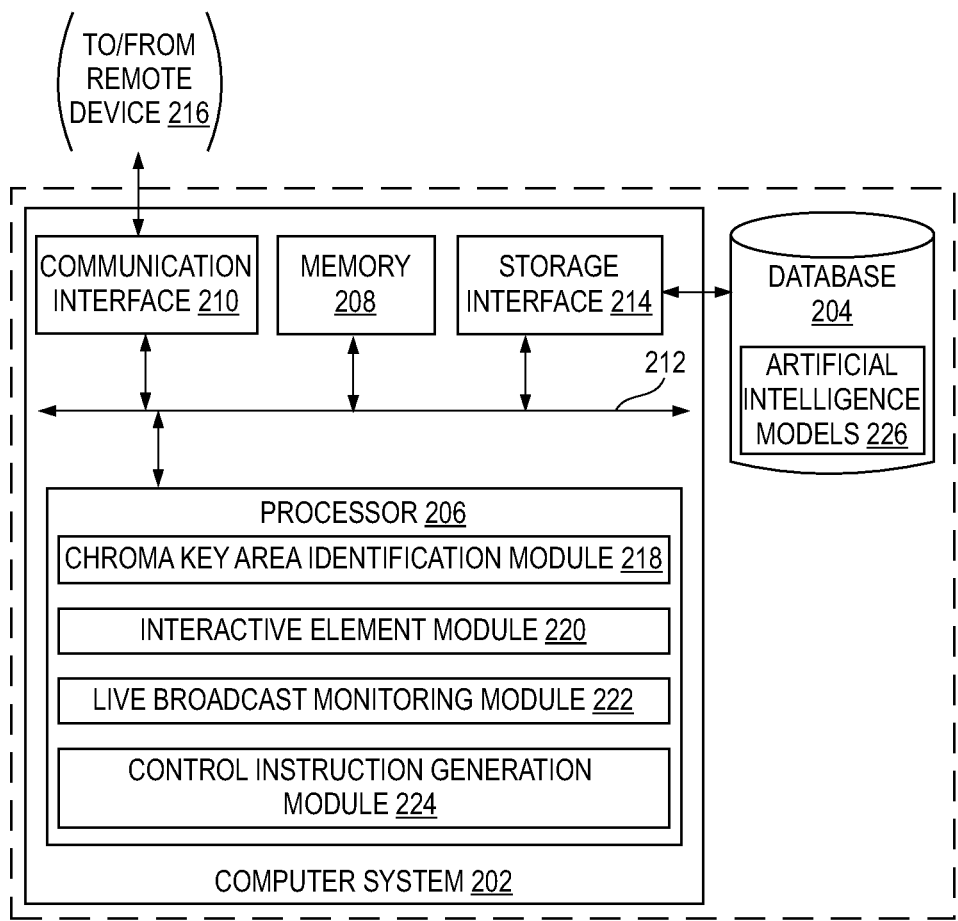
FIG. 2 illustrates a simplified block diagram of an application server used for rendering at least a portion of an interactive element in one or more chroma key areas in the live broadcast, in accordance with an embodiment of the present disclosure.

FIG. 2 illustrates a simplified block diagram of an application server 200 used for rendering the interactive element in the one or more chroma key areas in the live broadcast, in accordance with an embodiment of the present disclosure. Examples of the application server 200 include, but are not limited to, the application server 118 as shown in FIG. 1. The application server 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the live streaming interactive platform 120 and one or more components of the live streaming interactive platform 120. Further, the database 204 may be configured to store one or more artificial intelligence (AI) models 226. The AI models 226 may be trained with training data. The training data may include, but is not limited to, control instruction data, one or more preset actions, sexual content, user body parts (e.g., hands, shoulders, chest, buttocks, genital area, etc.). The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the application server 200, as described herein. In some embodiments, the memory 208 may be realized in the form of a database server or cloud storage working in conjunction with the application server 200, without deviating from the scope of the present disclosure.

The processor 206 is operatively coupled to the communication interface 210 such that the processor 206 is capable of communicating with a remote device 216 such as the user devices 104a-104c and the user device 108, or with any entity connected to the network 116 as shown in FIG. 1.

It is noted that the application server 200 as illustrated and hereinafter described is merely illustrative of an apparatus that could benefit from embodiments of the present disclosure and, therefore, should not be taken to limit the scope of the present disclosure. It is noted that the application server 200 may include fewer or more components than those depicted in FIG. 2.

In one embodiment, the processor 206 includes a chroma key area identification module 218, an interactive element module 220, a live broadcast monitoring module 222, and a control instruction generation module 224. As such, the one or more components of the processor 206 as described above are communicably coupled with the live-streaming interactive platform 120.

The chroma key area identification module 218 includes a suitable logic and/or interfaces for identifying the chroma key areas in the live broadcast created by the creator 106. The chroma key area identification module 218 identifies the one or more chroma key areas in the live broadcast based on the trained AI models 226. In particular, the chroma key areas may be defined by the creator 106 or may be pre-defined for the live broadcast in the live streaming interactive platform 120. In an embodiment, the chroma key areas may include one or more body parts of the creator 106 (e.g., green paint may be smeared on the body parts of the creator 106), at least one element (e.g., a piece of green cloth, green paint smeared on the wall a green colored object, etc.) present in a frame being streamed in the live broadcast, an area defined by the creator 106 within the frame (e.g., a closed green area defined by the creator 106 on the wall), and the like. In another embodiment, the chroma key areas may include an area defined by blue color, or blue screen, etc. As explained above, the AI model 226 is trained with the data related to the chroma key areas and stored in the database 204 associated with the application server 200.

Further, the chroma key area identification module 218 with access to the AI model 226 identifies the chroma key areas in the live broadcast created by the creator 106 in the live streaming interactive platform 120. In particular, the chroma key area identification module 218 identifies the presence of at least one pre-defined color (e.g., green) in the live broadcast. The pre-defined color in the live broadcast allows the implementation of the CSO technique for rendering at least the portion of the interactive element in the live broadcast. Further, the chroma key area identification module 218 determines portions of the pre-defined color in the live broadcast as the chroma key areas of the live broadcast.

In addition, the chroma key area identification module 218 determines a chroma key area type of each of the chroma key areas identified in the live broadcast. The chroma key area type may be at least a static area and a dynamic area. In particular, the chroma key area identification module 218 tracks motion-related factors of each of the chroma key areas in the live broadcast. The chroma key area identification module 218 determines at least one chroma key area among the chroma key areas in the live broadcast as the static area in case of determining the at least one chroma key area does not involve motion-related factors (i.e., movement, displacement, etc.). Some examples of the static area may include a piece of green cloth, green paint smeared on the wall a green-colored object, etc. The chroma key area identification module 218 determines the at least one chroma key area among the chroma key areas in the live broadcast as the dynamic area if the least one chroma key area involves motion-related factors (i.e., movement, motion of object, displacement, etc.). Some examples of the dynamic area may include the body parts of the creator 106, etc.

The interactive element module 220 includes suitable logic and/or interfaces for rendering at least the portion of the interactive element in the one or more chroma key areas of the live broadcast. More specifically, the interactive element module 220 obtains the interactive element to be displayed in the one or more chroma key areas based at least on user inputs from at least the creator 106 and the one or more users 102a-102c in the live streaming interactive platform 120 and live broadcast data. The interactive element or components of the interactive element corresponding to the user inputs may be stored in the database 204 associated with the application server 200.

In one scenario, the interactive element module 220 renders at least the portion of the interactive element based on the user inputs from the creator 106 and/or the users 102a-102c. The user inputs from the creator 106 and/or the users 102a-102c may include rewards, comments, options (e.g., special effects) selected in the live broadcast, real-time images of the one or more users 102a-102c, body special effects of the creator 106, and live broadcast duration. It is to be understood that the creator 106 or at least one user 102a-102c may provide inputs in the live broadcast by using their respective user device. The interactive element module 220 generates the interactive element based on the user inputs. The interactive element may include at least one of the text data, a pattern, special effects, and video data (e.g., real-time video data or prerecorded image/video data).

Thereafter, the interactive element module 220 determines a chroma key area among the one or more chroma key areas in the live broadcast corresponding to the interactive element for displaying the interactive element in the live broadcast. Upon determining the chroma key area corresponding to the interactive element, the interactive element 220 renders at least the portion of the interactive element in the chroma key area. Typically, the interactive element module 220 implements the image fusion technique for rendering the interactive element in the chroma key areas of the live broadcast. Some examples of the image fusion technique are a color separation overlay (CSO) technique, artificial intelligence (AI) rendering, Generative Pre-trained Transformer (GPT) technique, and the like. In addition, the interactive element is subjected to post-processing for fusing the interactive element rendered in one or more chroma key areas on at least a portion of the live broadcast outside the one or more chroma key areas. In other words, the dimension of the chroma key area maybe 20×20 centimeters (cm) in the live broadcast. Further, while rendering the interactive element in the chroma key area of 20×20 cm in the live broadcast, the interactive element is maximized such that a portion of the interactive element extends outside the chroma key area in the live broadcast upon completely overlapping on the chroma key area of dimension 20×20 cm.

Similarly, the interactive element module 220 monitors the live broadcast data for rendering at least the portion of the interactive element in the live broadcast. The live broadcast data may include but is not limited to, a live broadcast duration and number of users in the live broadcast. In particular, the interactive element 220 monitors the live broadcast data and simultaneously renders the live broadcast data in the form of text data (i.e., the interactive element). Also, the interactive element module 220 may render special effects as the interactive element in the live broadcast in case the number of users in the live broadcast of the creator 106 exceeds target values. For example, the target values for the number of users in the live broadcast may be set as 100, 200, 300, and the like. In this example scenario, the interactive element 220 renders the special effect as the interactive element in the live broadcast based on determining the number of users exceeding the target values.

Further, the application server 200 is configured to render the live broadcast of the creator 106 to the users 102a-102c upon performing post-processing of the interactive element. This enables the users 102a-102c to view the interactive element rendered in the chroma key areas of the live broadcast.

In one scenario, the interactive element rendered in the chroma key areas of the live broadcast may be displayed to the user who provided user inputs in the live broadcast. In other words, the interactive element module 220 renders at least the portion of the interactive element in the corresponding chroma key area of the live broadcast based at least on the user inputs from each of the users 102a-102c related to the customization of the interactive element. In this scenario, the interactive element is rendered in the chroma key areas of the live broadcast for the respective user (e.g., the user 102a) among the users 102a-120c in response to the receipt of the user inputs related to customization of the interactive element from the respective user.

The live broadcast of the creator 106 may include the users 102a-102c, from which the user 102a provides user inputs (e.g., reward/tip, comment) in the live broadcast. The user inputs provided by the user 102a for viewing the interactive element are related to the customization of the interactive element. In such a scenario, the interactive element module 220 renders at least the portion of the interactive element in the corresponding chroma key area in the live broadcast which is displayed to the user 102a. For example, the user 102a may provide a comment (i.e., user input) related to rendering the special effect in the chroma key area (e.g., breast) of the creator 106. In this example scenario, the interactive element module 220 renders the special effects to the chroma key area which results in increasing breasts of the creator 106. It is to be noted that the special effect is displayed to the user 102a who provided the user input. In other words, each of the users 102a-102c may view different interactive elements in the live broadcast based on the user inputs related to the customization of the interactive element. Similarly, the real-time video data/image data of the user 102a may be rendered in the chroma key area of the live broadcast and displayed only to the user 102a for experiencing better sexual stimulation which will be explained further in detail.

In another scenario, the interactive element may be visible to all the users 102a-102c of the live broadcast. For instance, the creator 106 may provide user input in the live broadcast for rendering the interactive element. In this scenario, the interactive element module 220 generates the interactive element and renders it in the corresponding chroma key area that will be displayed to each of the users 102a-102c of the live broadcast. For example, the creator 106 may provide text data as the user input in the live broadcast. In this scenario, the interactive element module 220 renders the text data in the corresponding chroma key area of the live broadcast, thereby allowing all the users 102a-102c to view the text data in the live broadcast. In some embodiments, the interactive element module 220 renders at least the portion of the interactive element in the corresponding chroma key area of the live broadcast for displaying to each of the users 102a-102c of the live broadcast in response to receipt of the user input from at least one user (e.g., the user 102a) of the live broadcast. Thus, it is to be understood that the different interactive elements may be rendered in the chroma key areas for each of the users 102a-102c of the live broadcast. In addition, at least the creator 106 and the users 102a-102c are allowed to interact with the interactive element displayed in the chroma key areas of the live broadcast by providing inputs in the live broadcast.

The live broadcast monitoring module 222 includes suitable logic and/or interfaces for monitoring actions of the creator 106, the chroma key areas, and the like. In particular, the live broadcast monitoring module 222 is configured to determine the change in the shape of the chroma key area based on one or more parameters such as the location of each of the chroma areas in the frame and a field of view (FOV) of the image capturing module 110. The live broadcast is captured by the image capturing module 110 and is being rendered in the live streaming interactive platform 120. It is to be understood that the field of view (FOV) of the image capturing module 110 changes when the image capturing module 110 is oriented in a different direction while capturing the live broadcast. In this scenario, the shape of the chroma key areas in the live broadcast appears to be different as the live broadcast is captured in a different direction. Further, the shape of the chroma key areas may appear different in the live broadcast due to the location of the chroma key area defined in the frame that is set for capturing the live broadcast. The change of shape of the chroma key areas in the live broadcast due to the location and the FOV of the image capturing module 110 is explained further in detail with reference to FIG. 4.

In this scenario, the live broadcast monitoring module 222 triggers the chroma key area identification module 218 to dynamically adjust the shape of the chroma key areas in the live broadcast based at least on the location of each of the chroma areas in the frame and the FOV of the image capturing module 110. As explained above, the dimension of the frame in the live broadcast (or the frame set for the live broadcast) captured by the image capturing module 110 is based on the FOV of the image capturing module 110. For example, the shape of the chroma key area may be defined as a rectangle in the live broadcast. It is to be understood that the rectangular shape of the chroma key area may appear as a parallelogram if the rectangular chroma key area is positioned at the corner of the frame. Specifically, due to the FOV of the image capturing module 110, the rectangular chroma key area is displayed as a parallelogram in the live broadcast. In this scenario, the chroma key area identification module 218 dynamically adjusts the shape based on the above-mentioned parameters. To that effect, the interactive element module 220 renders at least the portion of the interactive element in the chroma key areas corresponding to the shape of the one or more chroma areas in the live broadcast.

As explained above, the live broadcast monitoring module 222 is configured to monitor one or more preset actions of the creator 106 in the live broadcast. As explained above, the live broadcast includes the sexual content being performed by the creator 106 and/or the users 102a-102c. Further, the preset actions are performed by the creator 106 while the real-time image/video data of the user (e.g., the user 102a) including the sexual stimulation device 114a is rendered in the chroma key area of the live broadcast.

In particular, the live broadcast may be created as a private one-to-one live broadcast or created for any users using the live broadcast interactive platform 120. In private one-to-one live broadcast, the creator 106 may allow one user (e.g., the user 102a) to view the live broadcast in the live streaming interactive platform 120. In case of multiple users, the users (i.e., the users 102a-102c) may send a request to the creator 106 to view the live broadcast of the creator 106. Upon approval of the request, the users 102a-102c are allowed to view the live broadcast.

Further, the creator 106 may receive a request from a user (e.g., the user 102a) in the live broadcast to allow the display of real-time image/video data of the user 102a in a chroma key area of the one or more chroma key areas in the live broadcast. The real-time image data may be captured by the user device 104a of the user 102a. in this scenario, the real-time image data of the user 102a is rendered in the corresponding chroma key area of the live broadcast based at least on a live broadcast joining restriction and a viewing restriction. In one scenario, the live broadcast joining restriction allows auto approval of the request from the user 102a and facilitates displaying of the real-time image data of the user 102a in the corresponding chroma key area of the live broadcast. In another scenario, the creator 106 may set the live broadcast joining request which requires the approval of the request from the creator 106 for rendering the real-time image data in the corresponding chroma key area for the user 102a. Upon approval of the request, the application server 200 renders the real-time image data of the respective user 102a in the chroma key area of the live broadcast, thus enabling at least the creator 106 and the user 102a to interact with the chroma key area in the live broadcast.

The live broadcast monitoring module 222 determines the preset actions performed by the creator 106 while the real-time image/video data of the user 102a is rendered in the chroma key area of the live broadcast. The user 102a includes the sexual stimulation device 114a as explained above. The preset actions may include at least a sexual activity performed by the creator 106, the operation of a sex toy rendered as the interactive element in the chroma key area for stimulating the creator 106 in the live broadcast, and an audio output of the creator 106.

The control instruction generation module 224 includes suitable logic and/or interfaces for generating a control instruction based on performing real-time analysis of the preset actions of the creator 106 in the live broadcast. Thereafter, the control instruction generation module 224 transmits the control instruction to the user device 104a associated with the user 102a for operating the sexual stimulation device 114a to provide sexual stimulation to the user 102a corresponding to the preset actions performed by the creator 106 in the live broadcast.

In an embodiment, the live broadcast monitoring module 222 determines the preset actions of the creator 106 in case the real-time image/video data is not rendered in the chroma key area of the live broadcast. In such scenarios, the control instruction generation module 224 may generate the control instruction based on performing real-time analysis of the preset actions of the creator 106 in the live broadcast. The control instruction may be configured to operate the sexual stimulation devices 114a-114c of each of the users 102a-102c in the live broadcast.

Figure 3A:
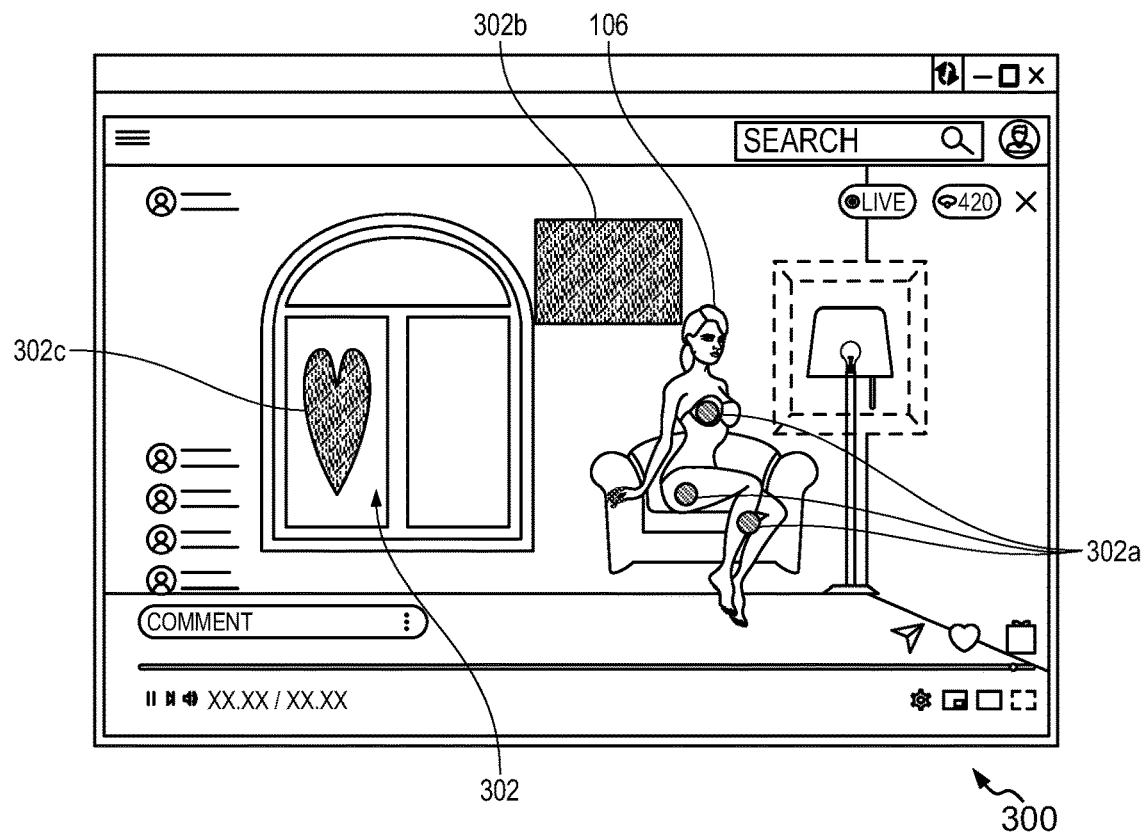
FIG. 3A illustrates an example representation of a user interface (UI) depicting a live broadcast of a creator rendered in a live streaming interactive platform, in accordance with an embodiment of the present disclosure.

FIG. 3A illustrates an example representation of a user interface (UI) 300 depicting a live broadcast of the creator 106 rendered in the live streaming interactive platform 120, in accordance with an embodiment of the present disclosure. As shown, the UI 300 is depicted on a laptop computer of a user. For example, the UI 300 may be rendered in the user device 108 of the creator 106. As explained above, the UI 300 depicts the live broadcast of the creator 106 in the live streaming interactive platform 120. The live broadcast includes the sexual content being performed by the creator

106. For instance, the creator 106 may utilize the sexual stimulation device 112 while performing the sexual content in the live broadcast.

The UI 300 is depicted to include one or more chroma key areas in the live broadcast. As shown, the chroma key areas are defined on one or more body parts (see, 302a) of the creator 106, at least one element (see, 302b) present in the frame being streamed in the live broadcast, and an area defined by the creator 106 within the frame (see, 302c). The chroma key areas 302a, 302b, and 302c are collectively referred to as the chroma key areas 302. The chroma key areas 302a are defined on the body parts of the creator 106 by green paint smeared on the body of the creator 106 or green cloth on the body parts of the creator 106 and the like. For example, the green area (i.e., the chroma key areas 302a) can be painted on the model's chest, or painted on the model's arms and buttocks superior (as shown in FIG. 3A). The element (e.g., a piece of green cloth hanging in the room of the creator 106) in the frame of the live broadcast is defined as the chroma key area 302b of the live broadcast. Further, a closed green curve (exemplarily represented as 'heat shape') defined by the creator 106 on the wall is the chroma key area 302c.

Figure 3B:
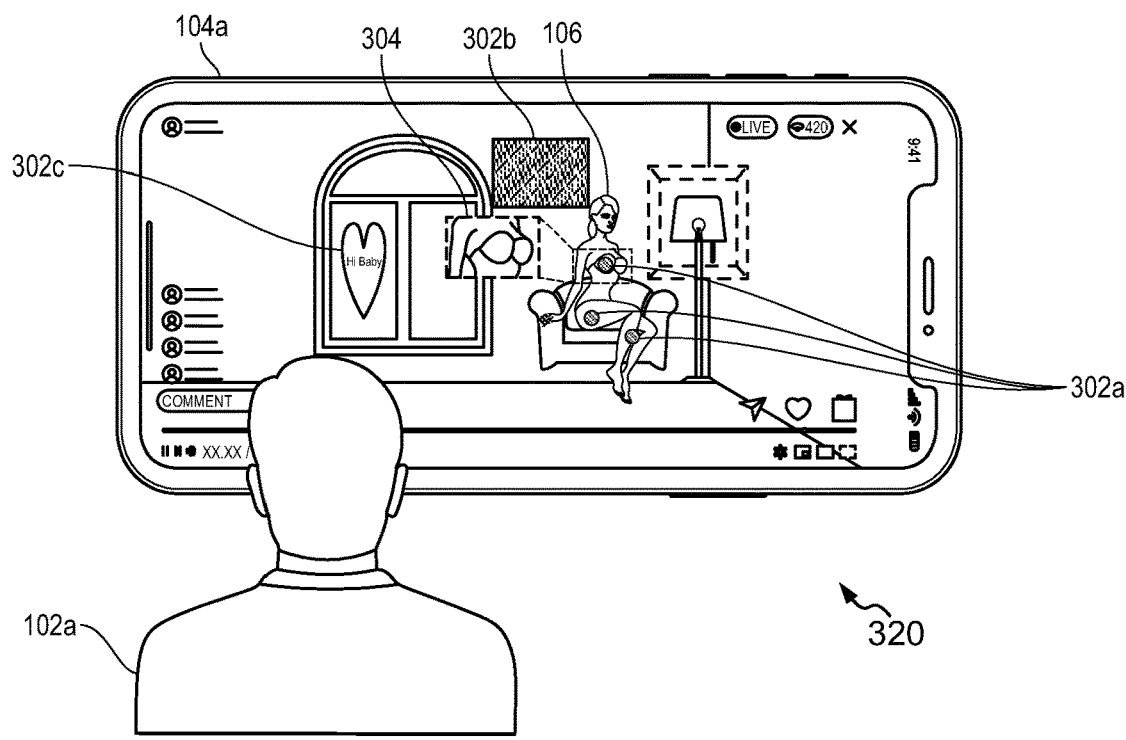
FIG. 3B illustrates an example representation of a UI depicting the live broadcast of the creator streamed to a user of the live streaming interactive platform, in accordance with an embodiment of the present disclosure.

The live broadcast is streamed to the users (e.g., the user 102a) through the live streaming interactive platform 120 (see, a user interface (UI) 320 of FIG. 3B). In particular, the user 102a may access the live streaming interactive platform 120 using the user device 104a for viewing the live broadcast of the creator 106. It is to be noted that the chroma key areas 302a-302c defined for the live broadcast are depicted to each of the users of the live broadcast. Hence, the user 102a can view the chroma key areas 302a-302c of the live broadcast. As shown in FIG. 3B, the chroma key areas 302a and 302c are rendered with at least the portion of the interactive element. For illustration purposes, the interactive element such as the text data (exemplarily depicted as 'Hi Baby') is rendered in the chroma key area 302c, and a special effect is rendered on the chest (i.e., the chroma key area 302a) of the creator 106. The special effect enables the display of an enlarged chest in the live broadcast. For illustrative purposes, the special effect (e.g., the enlarged chest) is overlaid (see, 304) in the UI 320. It is to be understood that the interactive element rendered in the chroma key areas 302a-302c in the UI 320 is based on the user inputs of the user 102a and/or the creator 106. Further, the creator 106 and the user 102a are allowed to interact with the interactive element rendered in the chroma key areas 302a-302c of the live broadcast. Furthermore, rendering of the interactive element, interaction with the interactive element, etc., are already explained with reference to FIG. 2, therefore they are not reiterated herein for the sake of brevity.

Figure 4:
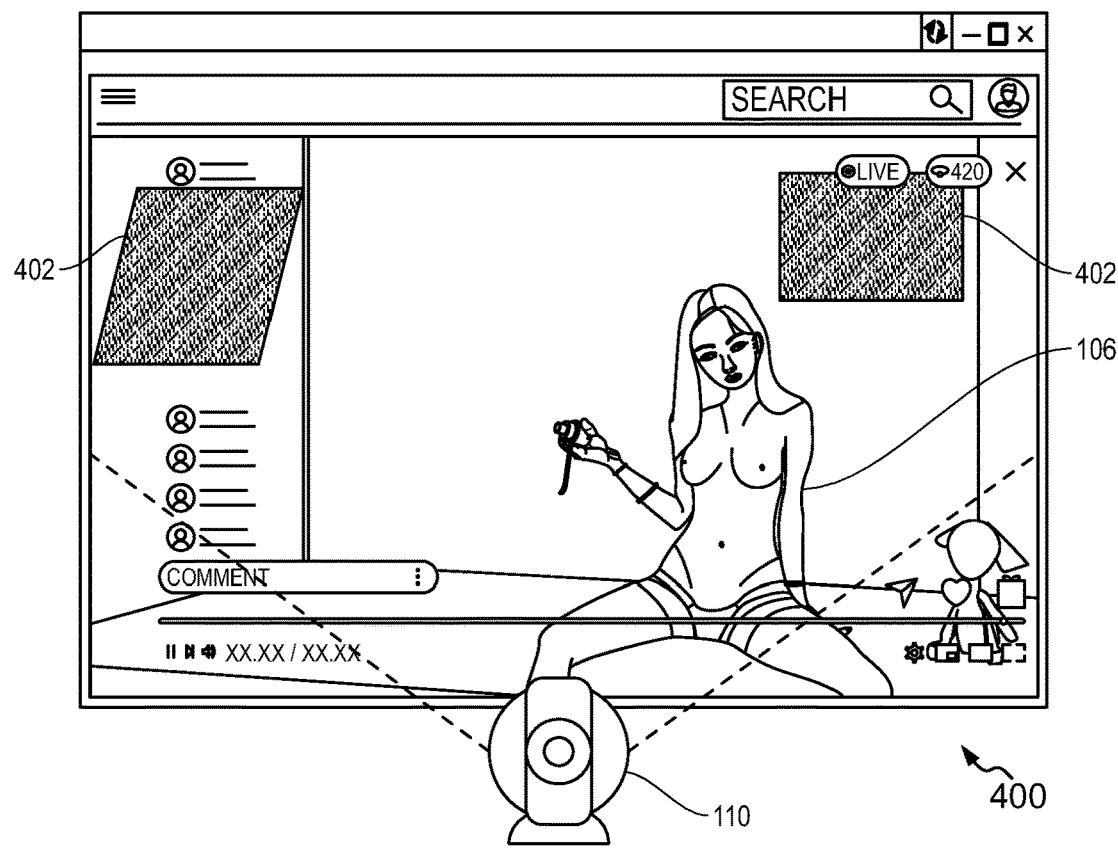
FIG. 4 illustrates an example representation of a frame of the live broadcast depicting a shape of the chroma key areas in the frame being captured by an image capturing module of the creator, in accordance with an embodiment of the present disclosure.

FIG. 4 illustrates an example representation of a frame 400 of the live broadcast depicting the shape of the chroma key areas in the frame being captured by the image capturing module 110 of the creator 106, in accordance with an embodiment of the present disclosure. In this scenario, the image capturing module 110 may be positioned in front of the creator 106. As shown in FIG. 4, the live broadcast includes chroma key areas (see, 402). The chroma key areas 402 are an example of the chroma key areas 302b of FIG. 3A. It is to be noted that the chroma key areas 402 are of rectangular shape. As explained above, the shape of the chroma key areas 402 in the frame 400 is based on the FOV (exemplarily depicted using broken lines) of the image capturing module 110 and a location (e.g., left top corner) of the chroma key area 402. As shown, the chroma key area 402 at the left top corner of the 400 appears as a parallelogram due to the FOV of the image capturing module 110. The application server 200 dynamically adjusts the shape of the chroma key areas 402 in the live broadcast based on the location of the chroma key areas 402 in the frame 400 and the FOV of the image capturing module 110. To that effect, the application server 200 renders the interactive element in the chroma key areas 402 corresponding to the shape of the chroma key areas 402 in the live broadcast. The interactive element (e.g., the text data 'Hi baby') depicted in FIG. 3A appears to be adjusted to the shape of the parallelogram (i.e., the chroma key area 402 (as shown in FIG. 4).

Figure 5A:
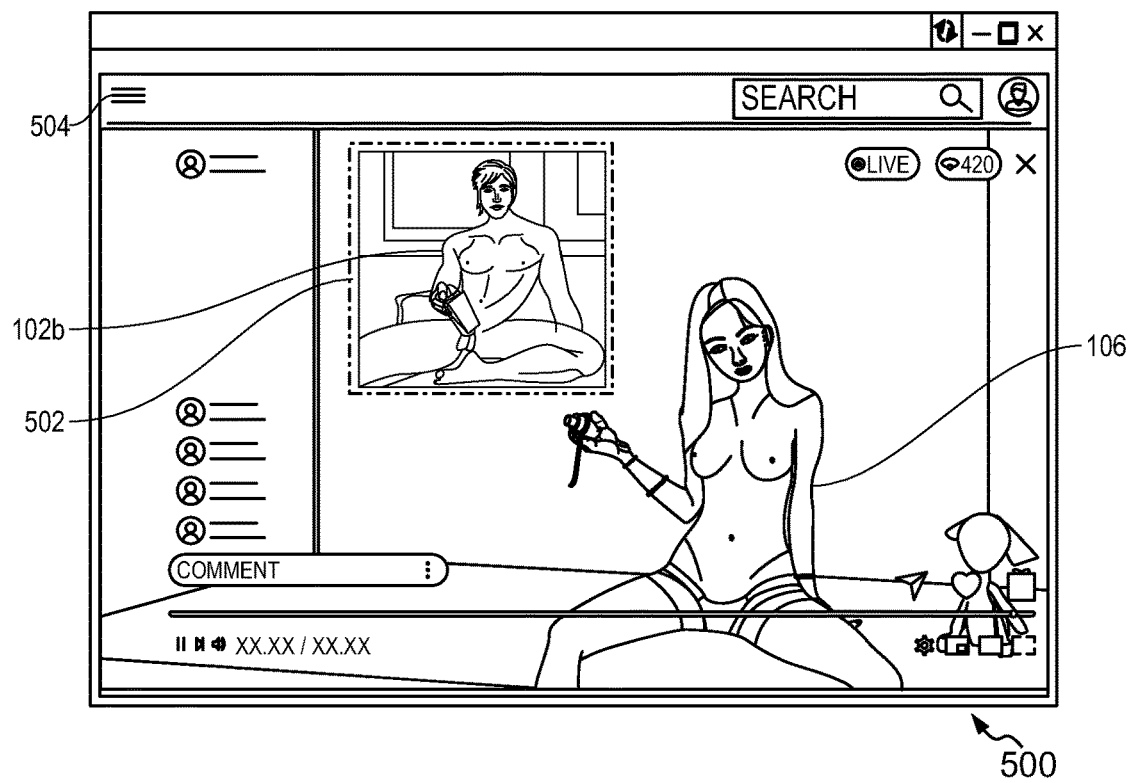
FIG. 5A illustrates an example representation of a UI rendered to the user viewing the live broadcast of the creator through the live streaming interactive platform, in accordance with an embodiment of the present disclosure, in accordance with an embodiment of the present disclosure.

FIG. 5A illustrates an example representation of UI 500 rendered to a user viewing the live broadcast of the creator 106 through the live streaming interactive platform 120, in accordance with an embodiment of the present disclosure. For example, the UI 500 is depicted to the user 102b on the user device 104b (e.g., the laptop computer). As shown the user 102b including the sexual stimulation device 114b is displayed in a chroma key area 502 of the live broadcast. The chroma key area 502 rendered in the UI 500 is an example of the chroma key areas 402 and 302.

As explained above, the live broadcast rendered in the UI 500 is based on the user inputs of the user 102b. Generally, the user 102b may masturbate while watching the sexual content of the creator 106 in the live broadcast, or use sex toys (i.e., the sexual stimulation device 114b) for stimulation. In this scenario, the user 102b may provide user inputs in the live broadcast using an option 504 of the UI 500. Upon clicking the option 504, a drop-down list (not shown in figures) may be rendered to allow the user 102b to select the interactive element related to rendering the real-time video/image data in the chroma key area 502 of the live broadcast. Thereafter, the user's (i.e., the user 102b) video data/image data shot by the user 102b using the user device 104b is displayed on the green screen (i.e., the chroma key area 502) in the live broadcast. In an embodiment, the creator 106 streams the live broadcast using a different live streaming interactive platform. In this scenario, the relevant content (i.e., the interactive element) of the corresponding live streaming interactive platform can be rendered on the chroma key areas. For example, the creator 106 streams the live broadcast using the different live streaming interactive platform at the same time, the creator 106 can customize a live broadcast introduction information for different live streaming interactive platforms, thus the user 102b from different live streaming interactive platforms may watch the corresponding live broadcast introduction information for different live streaming interactive platforms, wherein the corresponding live broadcast introduction information as the interactive element.

Figure 5B:
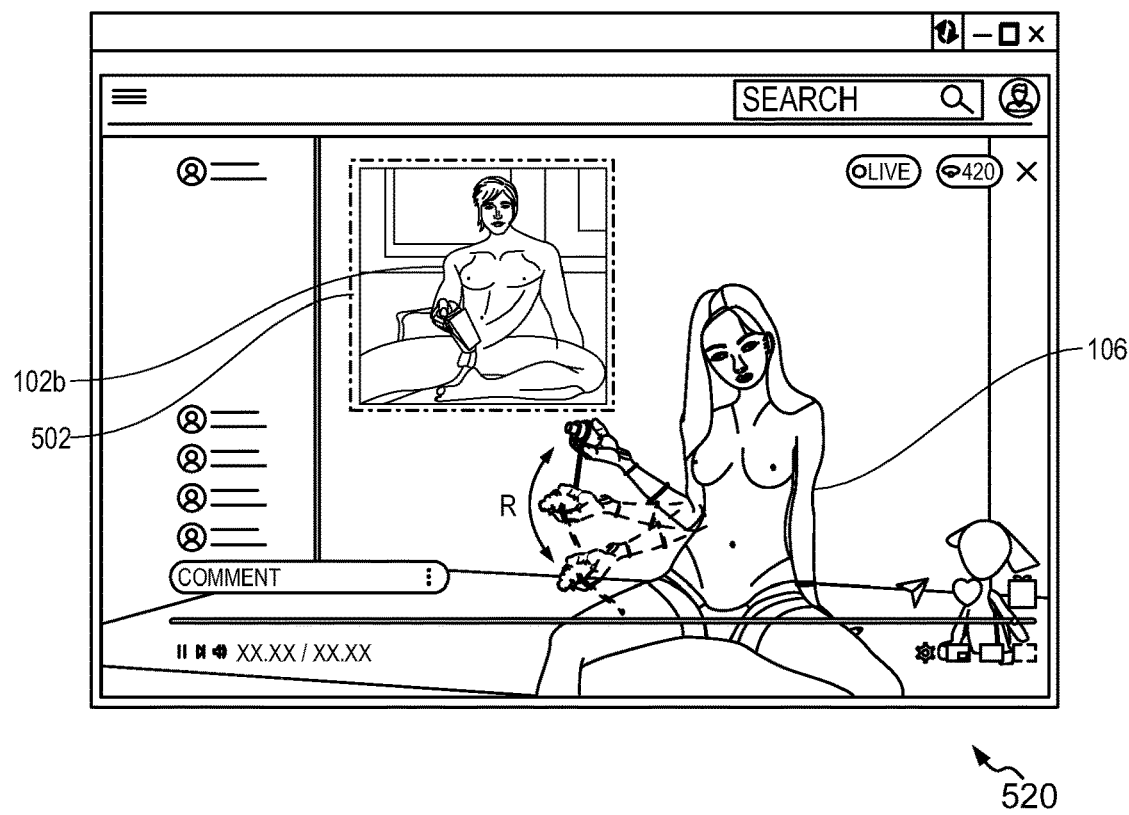
FIG. 5B illustrates an example representation of a UI depicting preset actions performed by the creator in the live broadcast while a real-time video/image data of the user is rendered in the chroma key area of FIG. 5A, in accordance with an embodiment of the present disclosure.

FIG. 5B illustrates an example representation of a user interface (UI) 520 depicting preset actions performed by the creator 106 in the live broadcast while the real-time video/image data of the user is rendered in the chroma key area of FIG. 5A, in accordance with an embodiment of the present disclosure. The UI 520 is depicted to include the creator 106 performing the one or more preset actions. The preset actions may include, but are not limited to, at least a sexual activity performed by the creator 106. As shown, the preset action performed by the creator 106 is depicted as the hands of the creator 106 making a masturbation action (i.e., waving the hands up and down). For illustration purposes, the masturbation action (i.e., the movement of the hand) performed by the creator 106 is depicted using an arrow (exemplarily indicated as 'R' in FIGS. 5B and 5C).

Figure 5C:
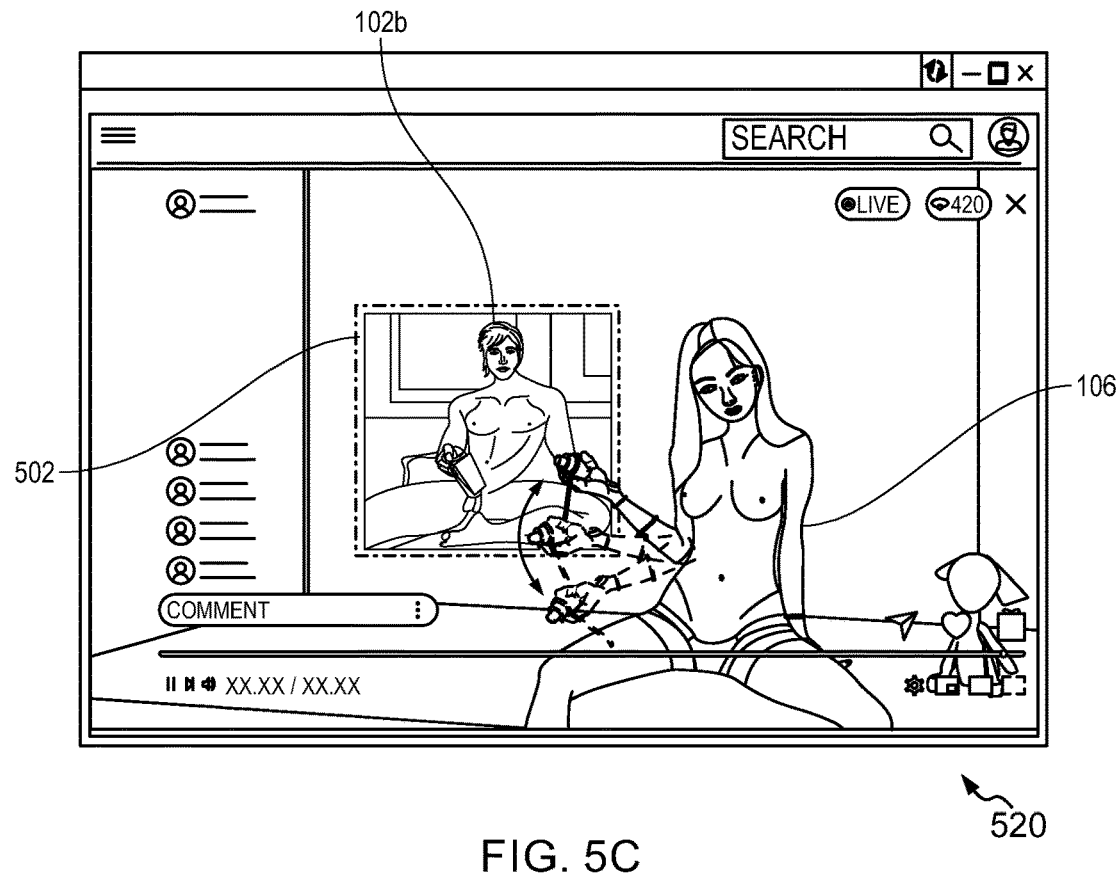
FIG. 5C illustrates an example representation of a UI depicting preset actions performed by the creator overlaps on the chroma key area of FIG. 5A while a real-time video/image data of the user is rendered in the chroma key area, in accordance with an embodiment of the present disclosure.

In an example scenario the creator 106 performs the preset actions (e.g., masturbation action) in the vicinity of the (e.g., front) of the chroma key area (as shown in FIG. 5B) while the real-time video/image data of the user 102b is rendered in the chroma key area 502. In another example scenario, the preset actions performed by the creator 106 in the live broadcast overlap with the chroma key area 502 while the real-time video/image data of the user 102b is rendered in the chroma key area 502 (as shown in FIG. 5C). It is to be noted that the user 102b views the live broadcast and determines that the creator's (i.e., the creator 106) hand waves up and down making a motion similar to masturbation (i.e., the preset action) in the live broadcast while the chroma key area 502 is rendered with the real-time image/video data.

In both scenarios, the application server 200 generates the control instruction based on real-time analysis of the preset actions of the creator 106 in the live broadcast. Thereafter, the application server 200 transmits the control instruction to the user device 104b associated with the user 102b for operating the sexual stimulation device 114b to provide sexual stimulation to the user 102b corresponding to the preset actions performed by the creator 106 in the live broadcast. The control instruction operates the sexual stimulation device 114b for imitating the movement of the creator's hand to perform the corresponding actions. For example, the frequency of the sexual stimulation device 114b may be varied corresponding to the preset actions of the creator 106 for providing sexual stimulation to the user 102b. In other words, the faster the creator 106 moves the hand, the higher the frequency of reciprocating stimulation of the stimulation structure in the sexual stimulation device 114b.

Figure 5D:
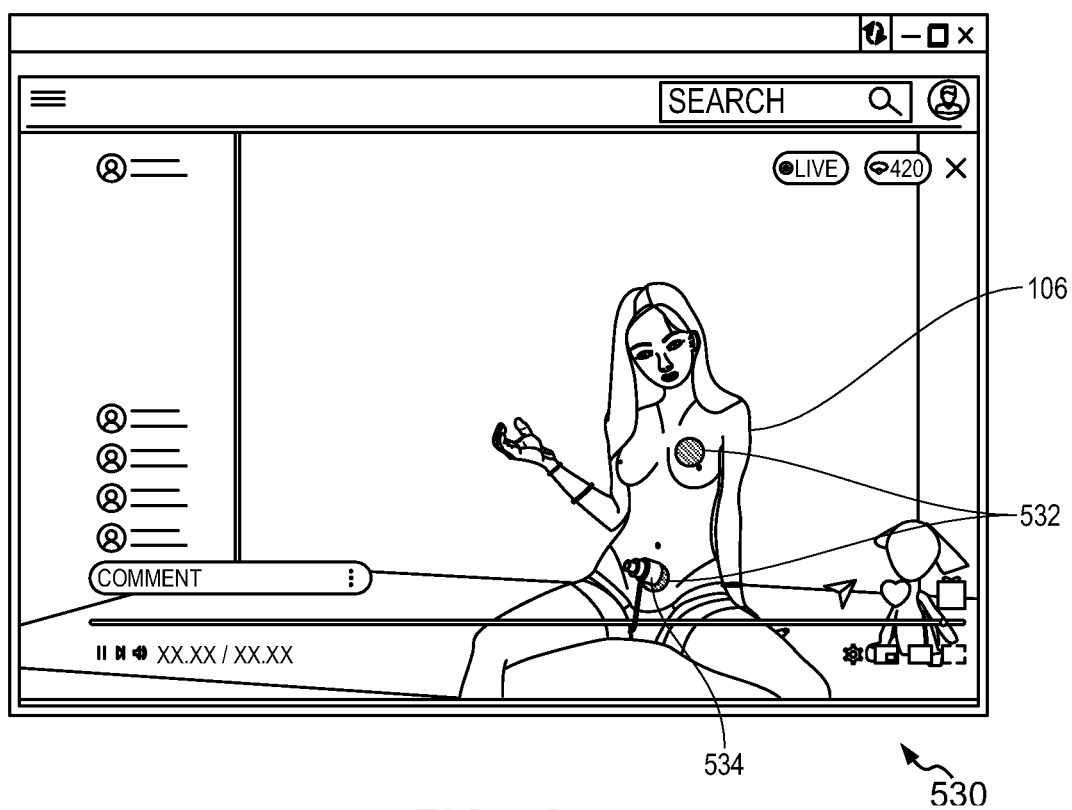
FIG. 5D illustrates an example representation of a UI depicting a sex toy rendered as the interactive element in the chroma key area, in accordance with an embodiment of the present disclosure.

Referring to FIG. 5D, a user interface (UI) 530 is depicted to the users of the live broadcast. For example, the UI 530 is depicted in the user device 102b of the user 102b. The UI 530 is depicted to include chroma key areas 532. The chroma key areas 532 are similar to the chroma key areas 302, 402, and 502. As shown, the chroma key areas 532 are rendered on the chest and lower abdominal area of the creator 106. In this scenario, the application server 200 obtains an operation of the sexual stimulation device 112 of the creator 106 for stimulating the creator 106 in the live broadcast. Thereafter, the operation of the sexual stimulation device 112 is rendered as the interactive element in one of the chroma key areas (see, 532) for stimulating the creator 106 in the live broadcast. As shown, the UI 540 is depicted to include a sex toy (see, 534) rendered as the interactive element in one of the chroma key areas 532. The sex toy (see, 534) represents the sexual stimulation device 112 of the creator 106. Further, the application server 200 generates an operation instruction in the case of determining the operation of the sex toy 534 (i.e., the sexual stimulation device 112) pertains to providing sexual stimulation to the creator 106 in the live broadcast. The operation instruction results in automatically changing or updating the interactive element rendered in the chroma key area 534 in the live broadcast. The interactive element may be defined for the operation of the sex toy 534 (or the sexual stimulation device 112) for stimulating the creator 106. As such, the application server 200 with access to the database 204 renders the corresponding interactive element in the chroma key areas 532. In addition, the application server 200 generates the operation instruction in response to detecting user actions in the real-time image data of at least one user (e.g., the user 102b) rendered as the interactive element in the one or chroma key areas of the live broadcast (as shown in FIG. 5A). The user actions may include performing masturbating actions using the sexual stimulation device 114b associated with the user 102b, or sexual activity performed by the user 102b. The operation instruction results in updating the interactive element rendered in the chroma key area in the live broadcast. Further, the UI 500, 520, and 530 may be rendered to other users (e.g., the user 102a, 102c) of the live broadcast, and similar operations may be performed as explained above.

Figure 6:
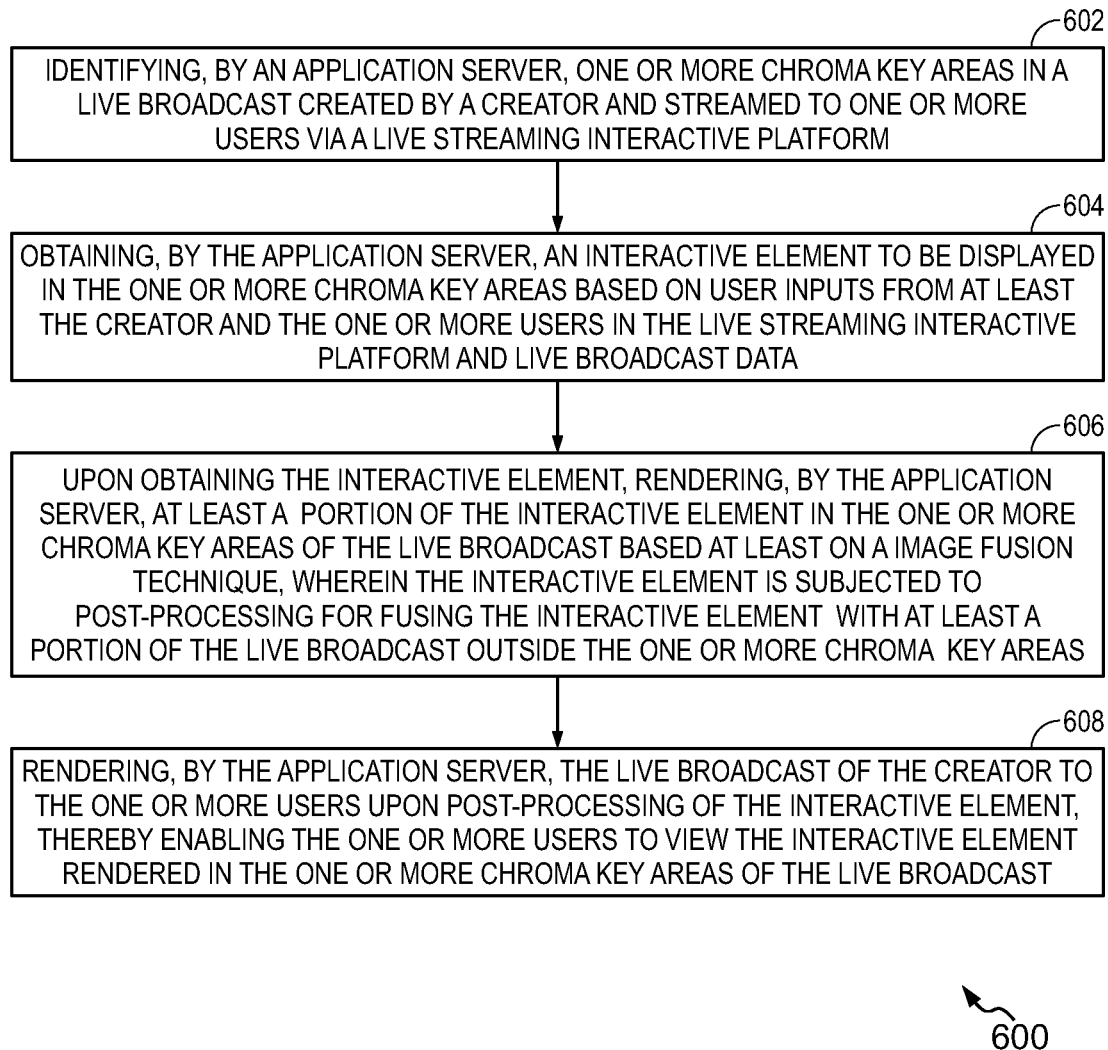
FIG. 6 illustrates a flow diagram of a computer-implemented method for dynamically rendering an interactive element in chroma key areas defined in the live broadcast, in accordance with an embodiment of the present disclosure.

FIG. 6 illustrates a flow diagram of a computer-implemented method 600 for dynamically rendering at least the portion of an interactive element in chroma key areas defined in the live broadcast, in accordance with an embodiment of the present disclosure. The method 600 depicted in the flow diagram may be executed by, for example, the application server 200 or the application server 118. Operations of the flow diagram of the method 600, and combinations of the operations in the flow diagram of the method 600, may be implemented by, for example, hardware, firmware, a processor, circuitry, and/or a different device associated with the execution of software that includes one or more computer program instructions. It is noted that the operations of the method 600 can be described and/or practiced by using a system other than these server systems. The method 600 starts at operation 602.

At operation 602, the method 600 includes identifying, by an application server 200, one or more chroma key areas in a live broadcast created by the creator 106 and streamed to the one or more users 102a-102c via the live streaming interactive platform 120.

At operation 604, the method 600 includes obtaining, by the application server 200, an interactive element to be displayed in the one or more chroma key areas based on user inputs from at least the creator and the one or more users in the live streaming interactive platform and live broadcast data.

At operation 606, the method 600 includes upon obtaining the interactive element, rendering, by the application server 200, at least the portion of the interactive element in the one or more chroma key areas of the live broadcast based at least on an image fusion technique. The interactive element is subjected to post-processing for fusing the interactive element with at least a portion of the live broadcast outside the one or more chroma key areas.

At operation 608, the method 600 includes rendering, by the application server 200, the live broadcast of the creator 106 to the one or more users 102a-102c upon post-processing of the interactive element, thereby enabling the one or more users 102a-102c to view the interactive element rendered in the one or more chroma key areas of the live broadcast. Further, the operations related to dynamically rendering the interactive element in the live broadcast are already explained with reference to FIGS. 1 to 5A-5D, and therefore they are not reiterated, for the sake of brevity.

Figure 7:
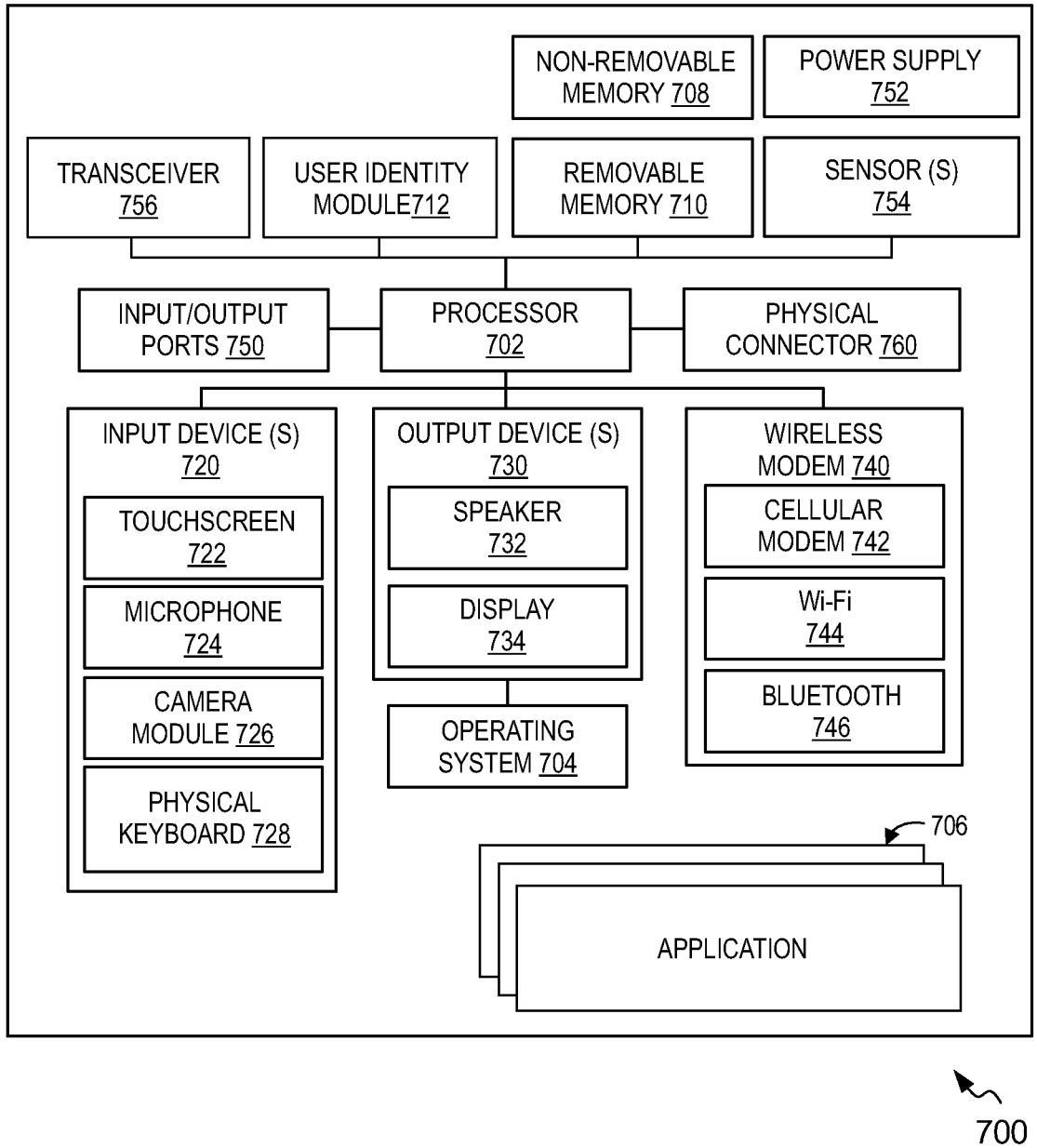
FIG. 7 is a simplified block diagram of an electronic device capable of implementing various embodiments of the present disclosure.

FIG. 7 is a simplified block diagram of an electronic device 700 capable of implementing various embodiments of the present disclosure. For example, the electronic device 700 may correspond to the user devices 104a-104c and 108 of FIG. 1. The electronic device 700 is depicted to include one or more applications 706. For example, the one or more applications 706 may include components of the live streaming interactive platform 120 of FIG. 1. One of the one or more applications 706 installed on the electronic device 700 is capable of communicating with a server (i.e., the application server 200 or the application server 118) for dynamically rendering the interactive element in the live broadcast.

It should be understood that the electronic device 700 as illustrated and hereinafter described is merely illustrative of one type of device and should not be taken to limit the scope of the embodiments. As such, it should be appreciated that at least some of the components described below in connection with the electronic device 700 may be optional and thus in an embodiment may include more, less or different components than those described in connection with the embodiment of the FIG. 7. As such, among other examples, the electronic device 700 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the electronic device 700 and supports for one or more operations of the application (see, the applications 706) that implements one or more of the innovative features described herein. In addition, the applications 706 may include common mobile computing applications (e.g., telephony applications, email applications, calendars, contact managers, web browsers, messaging applications) or any other computing application.

The illustrated electronic device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The memory components can be used for storing data and/or code for running the operating system 704 and the applications 706. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700 and biometric sensors for scanning biometric identity of an authorized user, a transceiver 756 (for wirelessly transmitting analog or digital signals) and/or a physical connector 760, which can be a USB port, IEEE 1294 (Fire Wire) port, and/or RS-232 port. The illustrated components are not required or all-inclusive, as any of the components shown can be deleted and other components can be added.

The disclosed method with reference to FIG. 6, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a non-transitory computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
    identifying, by an application server, one or more chroma key areas in a live broadcast created by a creator and streamed to one or more users via a live streaming interactive platform, wherein the one or more chroma key areas comprise at least one of: one or more body parts of the creator, at least one element present in a frame being streamed in the live broadcast, and an area defined by the creator within the frame;
    obtaining, by the application server, an interactive element to be displayed in the one or more chroma key areas based on user inputs from at least one of the creator and the one or more users in the live streaming interactive platform, and live broadcast data;
    upon obtaining the interactive element, rendering, by the application server, at least a portion of the interactive element in the one or more chroma key areas of the live broadcast based at least on an image fusion technique, wherein the interactive element is subjected to post-processing for fusing the interactive element with at least a portion of the live broadcast outside the one or more chroma key areas; and
    rendering, by the application server, the live broadcast of the creator to the one or more users upon post-processing of the interactive element, thereby enabling the one or more users to view the interactive element rendered in the one or more chroma key areas of the live broadcast.

2. The computer-implemented method as claimed in claim 1, further comprising:
    identifying, by the application server, a presence of at least one pre-defined color in the live broadcast, wherein the at least one pre-defined color in the live broadcast allows implementation of the image fusion technique for rendering at least the portion of the interactive element in the live broadcast, wherein the image fusion technique corresponds to a color separation overlay (CSO) technique; and
    determining, by the application server, portions of the at least one pre-defined color in the live broadcast as the one or more chroma key areas of the live broadcast.

3. The computer-implemented method as claimed in claim 1, wherein the one or more chroma key areas are identified as the one or more body parts of the creator based at least on one or more artificial intelligence (AI) models, and wherein the interactive element corresponding to a body part of the one or more body parts is obtained for displaying in a chroma key area associated with the body part.

4. The computer-implemented method as claimed in claim 1, further comprising:
    determining, by the application server, a chroma key area type of each of the one or more chroma key areas in the live broadcast, the chroma key area type comprising a static area and a dynamic area, wherein the chroma key area type of the one or more chroma key areas in the live broadcast is determined based at least on tracking motion related factors of each of the one or more chroma key areas.

5. The computer-implemented method as claimed in claim 1, further comprising:
    dynamically adjusting, by the application server, a shape of each of the one or more chroma key areas in the live broadcast based at least on a location of each of the one or more chroma areas in a frame and a field of view (FOV) of an image capturing module associated with the creator while capturing the live broadcast, wherein the dimension of the frame in the live broadcast captured by the image capturing module is based on the FOV of the image capturing module; and rendering, by the application server, at least the portion of the interactive element in the one or more chroma key areas corresponding to the shape of the one or more chroma areas in the live broadcast.

6. The computer-implemented method as claimed in claim 1, further comprising:

generating, by the application server, the interactive element in response to receipt of the user inputs from at least the creator and the one or more users in the live streaming interactive platform, the interactive element comprising a text data, a pattern, special effects, and a video data; and determining, by the application server, a chroma key area among the one or more chroma key areas in the live broadcast corresponding to the interactive element for displaying the interactive element in the live broadcast, wherein at least the creator and the one or more users are allowed to interact with the interactive element displayed in the live broadcast by providing inputs in the live broadcast.

7. The computer-implemented method as claimed in claim 6, wherein the user inputs in the live broadcast comprise rewards, comments, options selected in the live broadcast, real-time image data and real-time video data of the one or more users, and body special effects of the creator, and wherein the live broadcast data comprises at least a live broadcast duration and number of users in the live broadcast, and wherein the user inputs comprise an interactive operation associated with the interactive element from at least the creator and the one or more users, and the interactive operation results in updating the interactive element rendered in the chroma key area in the live broadcast.

8. The computer-implemented method as claimed in claim 1, further comprising rendering, by the application server, at least a portion of the interactive element in the one or more chroma key areas of the live broadcast based at least on the user inputs from each of the users related to customization of the interactive element, wherein at least a portion of the interactive element is rendered in the one or more chroma key areas of the live broadcast for respective user among the one or more users in response to the receipt of the user inputs related to customization of the interactive element from the respective user, thus enabling each of the one or more users to view different interactive element in the live broadcast.

9. The computer-implemented method as claimed in claim 1, further comprising:

receiving, by the application server, a request from a user among the one or more users in the live broadcast for displaying a real-time image data of the user in a chroma key area of the one or more chroma key areas in the live broadcast, the real-time image data being captured by the user device of the user; and in response to receipt of the request, rendering, by the application server, the real-time image data of the user as the interactive element in the chroma key area of the live broadcast for the user.

10. The computer-implemented method as claimed in claim 9, further comprising:

monitoring, by the application server, one or more preset actions performed by the creator in the live broadcast while the real-time image data of the user is rendered in the chroma key area of the live broadcast, wherein the live broadcast comprises a sexual content performed by the creator, the one or more preset actions comprising at least a sexual activity performed by the creator, and the user is using a sexual stimulation device;

generating, by the application server, a control instruction based on performing real-time analysis of the one or more preset actions of the creator in the live broadcast; and transmitting, by the application server, the control instruction to the user device associated with the user for operating the sexual stimulation device to provide sexual stimulation to the user corresponding to the one or more preset actions performed by the creator in the live broadcast.

11. The computer-implemented method as claimed in claim 1, further comprising:

obtaining, by the application server, an operation of the sexual stimulation device of the creator for stimulating the creator in the live broadcast; and rendering, by the application server, the operation of the sexual stimulation device as the interactive element in a chroma key area of the one or more chroma key areas for stimulating the creator in the live broadcast.

12. An application server, comprising:

a communication interface;

a memory storing executable instructions; and a processor operatively coupled with the communication interface and the memory, the processor configured to execute the executable instructions to cause the application server, at least in part, to:

identify one or more chroma key areas in a live broadcast created by a creator and streamed to one or more users via a live streaming interactive platform, wherein the one or more chroma key areas comprise at least one of: one or more body parts of the creator, at least one element present in a frame being streamed in the live broadcast, and an area defined by the creator within the frame, obtain an interactive element to be displayed in the one or more chroma key areas based on user inputs from at least one of the creator and the one or more users in the live streaming interactive platform, and live broadcast data, upon obtaining the interactive element, render at least a portion of the interactive element in the one or more chroma key areas of the live broadcast based at least on an image fusion technique, wherein the interactive element is subjected to post-processing for fusing the interactive element with at least a portion of the live broadcast outside the one or more chroma key areas, and render the live broadcast of the creator to the one or more users upon post-processing of the interactive element, thereby enabling the one or more users to view the interactive element rendered in the one or more chroma key areas of the live broadcast.

13. The application server as claimed in claim 12, wherein the application server is further caused, at least in part, to:

identify a presence of at least one pre-defined color in the live broadcast, wherein the at least one pre-defined color in the live broadcast allows implementation of the image fusion technique for rendering the interactive element in the live broadcast, wherein the image fusion technique corresponds to a color separation overlay (CSO) technique; and determine portions of the at least one pre-defined color in the live broadcast as the one or more chroma key areas of the live broadcast.

14. The application server as claimed in claim 12, wherein the application server is further caused, at least in part, to:
determine a chroma key area type of each of the one or more chroma key areas in the live broadcast, the chroma key area type comprising a static area and a dynamic area, wherein the chroma key area type of the one or more chroma key areas in the live broadcast is determined based at least on tracking motion related factors of each of the one or more chroma key areas.

15. The application server as claimed in claim 12, wherein the application server is further caused, at least in part, to:
dynamically adjust a shape of each of the one or more chroma key areas in the live broadcast based at least on a location of each of the one or more chroma areas in a frame and a field of view (FOV) of an image capturing module associated with the creator while capturing the live broadcast, wherein the dimension of the frame in the live broadcast captured by the image capturing module is based on the FOV of the image capturing module; and
render at least a portion of the interactive element in the one or more chroma key areas corresponding to the shape of the one or more chroma areas in the live broadcast.

16. The application server as claimed in claim 12, wherein the application server is further caused, at least in part, to:
generate the interactive element in response to receipt of the user inputs from at least the creator and the one or more users in the live streaming interactive platform, the interactive element comprising a text data, a pattern, special effects, and a video data,
wherein the user inputs in the live broadcast comprise rewards, comments, options selected in the live broadcast, real-time image data and real-time video data of the one or more users, and body special effects of the creator, and
wherein the live broadcast data comprises at least a live broadcast duration and number of users in the live broadcast; and
determine a chroma key area among the one or more chroma key areas in the live broadcast corresponding to the interactive element for displaying the interactive element in the live broadcast, wherein at least the creator and the one or more users are allowed to interact with the interactive element displayed in of the live broadcast by providing inputs in the live broadcast.

17. The application server as claimed in claim 12, wherein the application server is further caused, at least in part, to:
monitor one or more preset actions performed by the creator in the live broadcast while a real-time image data of a user of the one or more users is rendered as the interactive element in the chroma key area of the live broadcast, wherein the live broadcast comprises a sexual content performed by the creator, the one or more preset actions comprising at least a sexual activity performed by the creator, and the user using a sexual stimulation device;
generate a control instruction based on performing real-time analysis of the one or more preset actions of the creator in the live broadcast; and
transmit the control instruction to the user device associated with the user for operating the sexual stimulation device to provide sexual stimulation to the user corresponding to the one or more preset actions performed by the creator in the live broadcast.

18. The application server as claimed in claim 12, wherein the application server is further caused, at least in part, to:
obtain an operation of the sexual stimulation device of the creator for stimulating the creator in the live broadcast; and
render the operation of the sexual stimulation device as the interactive element in a chroma key area of the one or more chroma key areas for stimulating the creator in the live broadcast.

19. A non-transitory computer-readable storage medium comprising computer-executable instructions that, when executed by an application server, cause the [an] application server to perform a method comprising:
identifying one or more chroma key areas in a live broadcast created by a creator and streamed to one or more users via a live streaming interactive platform, wherein the one or more chroma key areas comprise at least one of: one or more body parts of the creator, at least one element present in a frame being streamed in the live broadcast, and an area defined by the creator within the frame;
obtaining an interactive element to be displayed in the one or more chroma key areas based on user inputs from at least one of the creator and the one or more users in the live streaming interactive platform, and live broadcast data;
upon obtaining the interactive element, rendering at least a portion of the interactive element in the one or more chroma key areas of the live broadcast based at least on an image fusion technique, wherein the interactive element is subjected to post-processing for fusing the interactive element with at least a portion of the live broadcast outside the one or more chroma key areas; and
rendering the live broadcast of the creator to the one or more users upon post-processing of the interactive element, thereby enabling the one or more users to view the interactive element rendered in the one or more chroma key areas of the live broadcast.

* * * * *